July 28, 1959  W. J. BRADBURN, JR  2,897,427
CONSTANT SURFACE SPEED REGULATOR
Filed Oct. 19, 1956
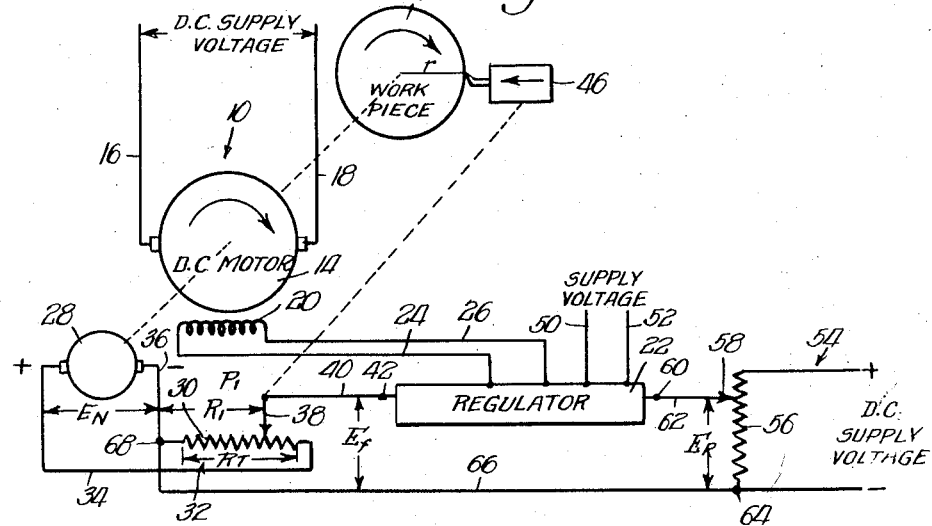
INVENTOR.
William J. Bradburn, Jr.,
BY
Wilkinson, Huxley,
Byron + Hume
ATTYS United States Patent Office 2,897,427
Patented July 28, 1959

2,897,427

CONSTANT SURFACE SPEED REGULATOR

William J. Bradburn, Jr., Milwaukee, Wis., assignor to The Louis Allis Co., Milwaukee, Wis., a corporation of Wisconsin Application October 19, 1956, Serial No. 617,089

3 Claims. (Cl. 318—145)

This invention relates to a speed control circuit for electric motors and more particularly, to a circuit which provides an adjustable speed drive capable of maintaining the linear surface speed of a rotating load driven by the motor at a constant value. Such systems are particularly useful in the speed control of cutting or grinding machines operating on a rotating workpiece.

In the case of a cutting machine having a constant speed of rotation, when the diameter of the workpiece is large, the speed of the outer surface or periphery thereof relative to the cutting tool is also large. As the diameter of the workpiece decreases due to the cutting action, however, the speed of the outer surface or periphery thereof relative to the tool also decreases.

In high speed automatic machines, this change in the relative speed of movement of the surface being worked, relative to the tool, can cause great difficulty. Unless some method is incorporated to keep the linear speed of the surface of the workpiece relative to the cutting tool within suitable limits, high speed cutting tools will have a very short life. Such tools are normally designed to operate within relatively narrow limits with regard to operating temperatures and large changes in cutting speed will, therefore, normally result in damage or destruction of the tool.

Likewise, in grinding operations it is often desirable to maintain the linear surface speed of the workpiece being ground substantially constant. Under such circumstances, the grinding action can be stabilized giving closer control over the operation which is highly necessary in precision grinding.

It is, therefore, an object of this invention to provide a speed drive of the character described that is capable of maintaining a constant linear surface speed in a rotating member.

It is also one of the objects of this invention to provide an adjustable speed drive which is particularly adapted for use with cutting or grinding machines operating on a rotating workpiece.

Another object of this invention is to provide an adjustable speed drive of the character described in which the speed of the drive motor is regulated by controlling the field or armature voltage of that motor, or both.

Still another object of this invention is to provide such a speed drive which may utilize any conventional type of regulator assembly or servo system to control the field or armature voltage.

Yet another object is to provide a speed drive of the character described which is relatively simple in both construction and operation and yet which gives good speed regulation with excellent stability and response characteristics.

Further objects and advantages of this invention will become evident as the description proceeds and from an examination of the accompanying drawing, which illustrates several embodiments of the invention and in which similar numerals refer to similar parts throughout the several views.

In the drawings:

Figure 1 is a somewhat diagramamtic showing of one form of adjustable speed drive incorporating the invention.

Figure 2 is a somewhat diagrammatic showing of an alternative form of adjustable speed drive incorporating the invention.

Referring now to Figure 1, a direct current motor indicated generally by the numeral 10 is shown diagrammatically therein together with a rotatable element adapted to be rotated by the motor, and which is here shown as the workpiece 12 in a cutting machine. The armature 14 of the motor 10 is connected across a source of substantially constant direct current voltage (not shown) by the lines 16 and 18. The motor 10 also is provided with a field winding 20 which is connected across the output of the regulator assembly 22 by the lines 24 and 26. The speed of the motor 10 is regulated by the output voltage of the regulator 22 in a manner which will be described below.

A tachometer generator 28 is also driven by the motor 10 and provides an output voltage $E_N$ that is proportional to the speed of the motor. The voltage $E_N$ is applied across the resistor 30 of the linear potentiometer 32 through the lines 34 and 36. The movable arm 38 of the potentiometer 32 is electrically connected through the line 40 to one of the control voltage terminals 42 of the regulator assembly 22, the latter being provided with a suitable supply voltage through the lines 50 and 52. The arm 38 is also physically connected to the cutting head 46 of the cutting machine, as indicated by the dotted line 48, so that the position of the arm 38 on the resistor 30 is determined by the position of the cutting head 46. Suitable gearing (not shown) may be provided for this purpose.

A constant, adjustable reference voltage is also applied to the control circuit of the regulator assembly 22. For this purpose the potentiometer 54 has a source of constant, direct current supply voltage connected across the resistor 56 thereof. The movable arm 58 of the potentiometer 54 is connected to the other control voltage terminal 60 on the regulator assembly 22 by the line 62. One end 64 of the resistor 56 is also connected through the line 66 to one end 68 of the resistor 30. This completes the control voltage circuit and the connections just described are poled so as to cause the output voltage $E_f$ from the potentiometer 32 to be compared against the output or reference voltage $E_R$ from the potentiometer 54. The difference signal $E_S$ is thus utilized as the control voltage for the regulator 22 and thus the magnitude of the voltage applied to the field winding 20 of the motor 10 is regulated.

The cutting speed in feet per minute (f.p.m.) in a device as is shown in Figure 1 can be expressed as the product of the revolutions per minute (r.p.m.), at which the workpiece 12 is turning, times the number of lineal feet (ft.) through which the workpiece travels per revolution (rev.) thereof, or:

$$\text{F.p.m.} = \text{r.p.m.} \times \frac{\text{ft.}}{\text{rev.}}$$

The number of lineal feet per revolution is actually the circumference of the material being worked ($2\pi r$), so:

$$\text{F.p.m.} = \text{r.p.m.} \times 2\pi r$$

where $r$ is the radius of the workpiece.

Since it is desired to maintain the lineal feet constant and since $2\pi$ is a constant, the equation can be rewritten:

$$K = Nr$$

where $N$ is the speed at which the workpiece is turning. Thus, in order to maintain the cutting speed constant (f.p.m.), it is necessary to maintain the product of the speed (r.p.m.) and the radius of the workpiece (r) a constant.

Such a result is obtainable with the elements shown in Figure 1 in the following manner. Since only a small voltage $E_S$ is required in the conventional regulator assembly, $E_R$ can be adjusted to be approximately equal to the voltage $E_f$. The voltage $E_f$ can be expressed:

$$E_f = E_N \frac{R_1}{R_T}$$

where $R_T$ is the total resistance of the resistor 30 in the potentiometer 32, and $R_1$ is the value of resistance between movable arm 38 of that potentiometer and the end 68 of the resistor 30. Thus $R_1$ is determined by and proportional to the position of the cutting head 46. The position of the cutting head, in turn, is proportional to the radius of the workpiece 12. Therefore, since:

$$R_T = K_1$$
and $$E_N = K_2 N$$
and $$R_1 = K_3 r$$
then $$E_f = K_2 N \frac{K_3 r}{K_1}$$
then $$E_f = K N r$$

Since the regulator assembly 22 will tend to maintain $E_f$ equal to $E_R$ which is a constant voltage, then:

$$E_f \approx E_R = K_5$$
and $$E_R = K_1 N r$$
then $$K_5 = K_1 N r$$
or $$K_6 = N r$$

and the initial equation is satisfied, namely, that in order to maintain the cutting speed constant, it is necessary to maintain the product of the speed and the radius of the workpiece a constant.

In view of the above, it seen that it is only necessary to initially select the desired cutting speed by adjusting $E_R$ to the proper value. Thereafter, the cutting speed will be maintained constant throughout the operation.

Referring now to Figure 2, an alternative form of speed regulator system is disclosed therein in which the speed of the D.C. motor 70 is regulated by controlling the armature voltage of the motor while applying a substantially constant voltage to the field winding 72 of the motor 70. The motor 70 rotates the workpiece 74 with the cutting head 76 being adapted to be moved into association therewith.

A D.C. generator 78 driven by an additional prime mover, such as a suitable electric motor (not shown), provides a source of armature voltage for the motor 70 through the lines 80 and 82. The regulator assembly 84 has its output voltage connected across the field winding 86 of the generator 78 through the lines 88 and 90. The regulator assembly, therefore, controls the magnitude of the generator field winding voltage which in turn determines the magnitude of the voltage applied to the armature of the D.C. motor 70. The regulator assembly 84 has a source of supply voltage (not shown) connected thereto through the lines 92 and 94.

The output of the D.C. generator 78 is also applied across the resistor 96 of the potentiometer, indicated generally by the numeral 98, through the lines 100 and 102. The movable arm 104 of the potentiometer 98 is connected through the line 106 to one of the terminals of the control circuit of the regulator assembly 84. The other terminal 110 of that circuit is connected to the movable arm 112 of the potentiometer 114, the resistor 116 of which is connected across a source of reference voltage by the lines 118 and 120. One end 122 of the resistor 116 is connected through the line 124 to the end 126 of the resistor 96 in the potentiometer 98. The movable arm 104 in the potentiometer 98 is suitably connected to the cutting head 76 so that the position of the arm 104 on the resistor 96 is determined by the relative position of the cutting head 76.

Instead of a tachometer generator as was utilized in the circuit shown in Figure 1, this present system is provided with a transductor indicated generally by the numeral 128 connected so that its control winding consists of the line 80 in the armature circuit of the motor 70. The load winding 130 of the transductor 128 is connected in series with the input side of the full wave bridge rectifier 132 across the input terminals 134 and 136 connected to a source of suitable alternating current voltage. The magnitude of the output current $i_o$ from the rectifier 132 is, therefore, controlled by the current $I_a$ and is directly proportional thereto, or:

$$i_o = k I_a$$

This D.C. current $i_o$ is applied across a load resistor 138 disposed in the line 100 producing a voltage $E_T$. Resistor 138($R_2$) can be selected so that the following relationship holds true:

$$E_T = i_o R_2 = I_a R_a$$

where $I_a R_a$ is the motor armature circuit resistance drop. The value of $R_2$ can be determined as follows:

$$R_2 = \frac{N_L}{N_C} R_a = \frac{R_a}{K_1}$$

where $N_L$ is the load winding turns in the transductor 128 and $N_C$ is the control winding turns therein.

As mentioned above the armature voltage of the motor is applied to the resistance 96 of the potentiometer 98, while the motor field excitation is maintained constant. The regulator 84 controls the excitation of the generator field 86 and therefore, the motor applied voltage.

Since the motor speed is proportional to the internal counter E.M.F. of the motor, the speed equation can be written:

$$K_2 N = E_M - I_a R_a$$

where $E_M$ is the motor terminal voltage and $I_a R_a$ is motor armature circuit resistance drop. The voltage across the potentiometer $P_1$ must be equal to $K_2 N$. This is accomplished by using the transductor SR whose output current $i_o$ across $R_2$ is directly proportional to the armature current $I_a$ and properly selecting the value of $R_2$ as outlined above, so that:

$$E_T = i_o R_2 = I_a R_a$$

The voltage across $P_1$ is then:

$$E_{P_1} = E_M - E_T$$

or $E_{P_1}$ is directly proportional to the speed of the motor.

It should be noted that although regulator systems are shown in Figures 1 and 2, the method can be applied equally well if servo systems are substituted in place of the regulator system shown. Also the method is not limited to the constant cutting speed system shown, but can be applied to any system where a constant surface speed of a rotating part is desired. Furthermore, the method can still be used with a combination field and armature control system.

In the drawing and specification, there has been set forth several preferred embodiments of the invention, and although specific terms are employed, they are used in a generic and descriptive sense only and not for purposes of limitation. Changes in form and in the proportion of parts, as well as the substitution of equivalents are contemplated, as circumstance may suggest or render expedient, without departing from the spirit or scope of this invention as further defined in the following claims.

What is claimed is:

1. An adjustable speed drive for maintaining the linear surface speed of a rotating member constant regardless of changes in the diameter thereof, comprising: a direct current motor driving said rotating member and having an armature and field winding; a direct current generator having a field winding; means for impressing the output of said generator across said armature; regulator means for regulating the voltage applied to said generator field winding; a source of substantially constant direct current voltage; means for applying said voltage to the field winding of said motor; a source of direct current voltage proportional to the speed of rotation of said rotating member; potentiometer means across which said last named voltage is applied; a movable arm in said potentiometer electrically connected in the control circuit of said regulator means; means for moving said potentiometer arm directly in accordance with variations in the diameter of said rotating member; a source of direct current supply voltage connected in said control circuit in opposition to the voltage obtained from said potentiometer; and a source of supply voltage for said regulator means.

2. An adjustable speed drive for maintaining the linear surface speed of a rotating member constant regardless of changes in the diameter thereof, comprising: a direct current motor driving said rotating member and having an armature and field winding; a direct current generator having a field winding; means for impressing the output of said generator across said armature; regulator means for regulating the voltage applied to said generator field winding; a source of substantially constant direct current voltage; means for applying said voltage to the field winding of said motor; a potentiometer means and a resistance means disposed in series and across which the output of said generator is applied; a transductor means providing a direct current voltage directly proportional to the current flowing in said armature winding in said motor; means for applying said last named voltage across said resistance in opposition to the output of said generator; a movable arm in said potentiometer electrically connected in the control circuit of said regulator means; means for moving said potentiometer arm directly in accordance with variations in the diameter of said rotating member; a source of direct current supply voltage connected in said control circuit in opposition to the voltage obtained from said potentiometer; and a source of supply voltage for said regulator means.

3. An adjustable speed drive for maintaining the linear surface speed of a rotating member constant regardless of changes in the diameter thereof, comprising: a direct current motor driving said rotating member and having an armature and field winding; a direct current generator having a field winding; means for impressing the output of said generator across said armature; regulator means for regulating the voltage applied to said generator field winding; a source of substantially constant direct current voltage connected to said motor field winding; a transductor, the control winding turns of which are disposed in series with the output of said generator and the load winding turns of which are in series with a source of alternating current and a rectifier; resistance means connected across the output of said rectifier; a potentiometer means connected in series with said resistance means, said resistance means and said potentiometer means being disposed in series across the output of said generator; a movable arm in said potentiometer electrically connected in the control circuit of said regulator means; means for moving said potentiometer arm directly in accordance with variations in the diameter of said rotating member; a source of direct current supply voltage connected in said control circuit in opposition to the voltage obtained from said potentiometer; and a source of supply voltage for said regulator means.

References Cited in the file of this patent

FOREIGN PATENTS

| | | |
|---|---|---|
| 974,938 | France | Oct. 4, 1950 |
| 649,219 | Great Britain | Jan. 24, 1951 |